United States Patent [19]
Rouse et al.

[11] Patent Number: 5,980,419
[45] Date of Patent: Nov. 9, 1999

[54] OVERDRIVE UNIT

[75] Inventors: Anthony Rouse, Coleshill; David Hiscox, Nr Leek, both of United Kingdom

[73] Assignee: GKN Drive Line Limited, United Kingdom

[21] Appl. No.: 09/099,006

[22] Filed: Jun. 17, 1998

[30] Foreign Application Priority Data

Dec. 9, 1997 [GB] United Kingdom .................... 9725918

[51] Int. Cl.⁶ ...................................................... F16H 3/44
[52] U.S. Cl. .......................................................... 475/326
[58] Field of Search .................................. 475/326, 327; 180/233; 74/665 G, 665 GA

[56] References Cited

U.S. PATENT DOCUMENTS

| | | | |
|---|---|---|---|
| 1,083,863 | 1/1914 | Schortman | 475/326 |
| 4,531,429 | 7/1985 | Shutt et al. | 475/326 |

FOREIGN PATENT DOCUMENTS

| | | |
|---|---|---|
| 0587273A1 | 3/1994 | European Pat. Off. . |
| 2062140 | 8/1981 | United Kingdom . |
| 2313884 | 12/1997 | United Kingdom . |

*Primary Examiner*—Dirk Wright
*Attorney, Agent, or Firm*—Fulwider Patton Lee & Utecht, LLP

[57] ABSTRACT

A vehicle having a transfer case is provided with an overdrive unit including an input shaft, an output shaft drivingly connectable to the input shaft, a control means having a first position in which the input shaft drives the output shaft at a first relative rate of rotation and a second position in which the input shaft drives the output shaft at a second different relative rate of rotation, the input shaft and the output shaft being disposed on the same side of the overdrive unit.

17 Claims, 5 Drawing Sheets

FIG. 6

OVERDRIVE UNIT

BACKGROUND TO THE INVENTION

This invention relates to an overdrive unit for vehicles.

Where a vehicle is provided with a limited range of gears, it is desirable to add a further high gear having a lower reduction ratio than that provided by the pre-existing highest gear. It is known to provide such a gear by means of an overdrive unit provided in the transmission of the vehicle.

SUMMARY OF THE INVENTION

It is an object of the invention to provide a new or improved overdrive unit.

According to a first aspect of the invention we provide an overdrive unit comprising an input shaft, an output shaft drivingly connectable to said input shaft, and control means having a first position wherein said input shaft drives said output shaft at a first relative rate of rotation and a second position wherein said input shaft drives said output shaft at a second different relative rate of rotation, said input shaft and said output shaft being disposed on the same side of the overdrive unit.

The first relative rate of rotation may be unity so that the input and output shafts rotate at the same rate of rotation and the second rate of relative rotation may be such that the output shaft rotates at a different rate of rotation to the input shaft.

Said output shaft may comprise a sleeve shaft and said input shaft may be disposed within and concentric with said output shaft.

The input shaft may be driveably connected to the output shaft by an intermediate gear means.

The intermediate gear means may comprise a planet gear supported by a planet carrier which is driveable by said input shaft, the planet gear being in mesh with an internally toothed annulus which is driveably connected to said output shaft, the planet gear also being in mesh with a sun gear which is rotatably mounted on and concentric with said input shaft.

The control means may comprise a brake means connected to said sun gear, whereby when the control means is in a first position the sun gear is constrained by the brake means to rotate at the same rate as the annulus, and when the control means is in a second position the sun gear is held stationary relative to a ground by the brake means.

The control means may comprise fluid pressure means whereby the control means is movable between its first position and its second position.

When the control means is in the second position, the output shaft may rotate at a rate in the range 25% to 33% greater than that of the input shaft.

According to a second aspect of the invention we provide a vehicle comprising an engine, a gearbox and a transfer unit wherein the transfer unit comprises an input and an output which are mutually laterally off-set, the vehicle further comprising an overdrive unit disposed on the opposite side of the transfer unit to the gearbox and the engine, the overdrive unit having an input shaft and an output shaft, the input shaft of the overdrive unit being driveably connected to the gearbox output shaft and the output shaft of the overdrive unit being in driving connection with the input of the transfer unit, the input shaft and output shaft of the overdrive unit being disposed on the same side of the overdrive unit.

The transfer unit may comprise a transfer case and bearing means in which the output shaft of the overdrive unit is journalled.

The gearbox output shaft may be connected to the input shaft of the overdrive unit by an input sleeve.

The input sleeve may engage splines provided on the gearbox output shaft.

The input of the transfer unit may comprise a gear mounted on the output shaft of the overdrive unit.

The overdrive unit may be an overdrive unit according to the first aspect of the invention.

According to a third aspect of the invention, we provide a method of providing an overdrive in a vehicle wherein the vehicle comprises an engine, a gearbox having an output shaft and a transfer unit, comprising a transfer case having an input and an output which are mutually laterally off-set, the method comprising the steps of attaching an overdrive unit to the transfer case on the opposite side thereof to the gearbox and the engine, such that an input shaft of the overdrive unit is drivably connected to the gearbox output shaft and an output shaft of the overdrive unit is in driving connection with the output of the transfer unit.

The method may comprise a step of removing a portion of the transfer case, removing an initial input gear of the transfer unit and providing a replacement gear which is drivingly connected to the output shaft of the overdrive unit and is in said driving connection with the output of the transfer unit.

The method may include the additional step of providing bearings in the transfer case wherein the output shaft of the overdrive unit is journalled.

The overdrive unit may be an overdrive unit according to the first aspect of the invention.

DESCRIPTION OF THE PREFERRED EMBODIMENTS

Figure 1:
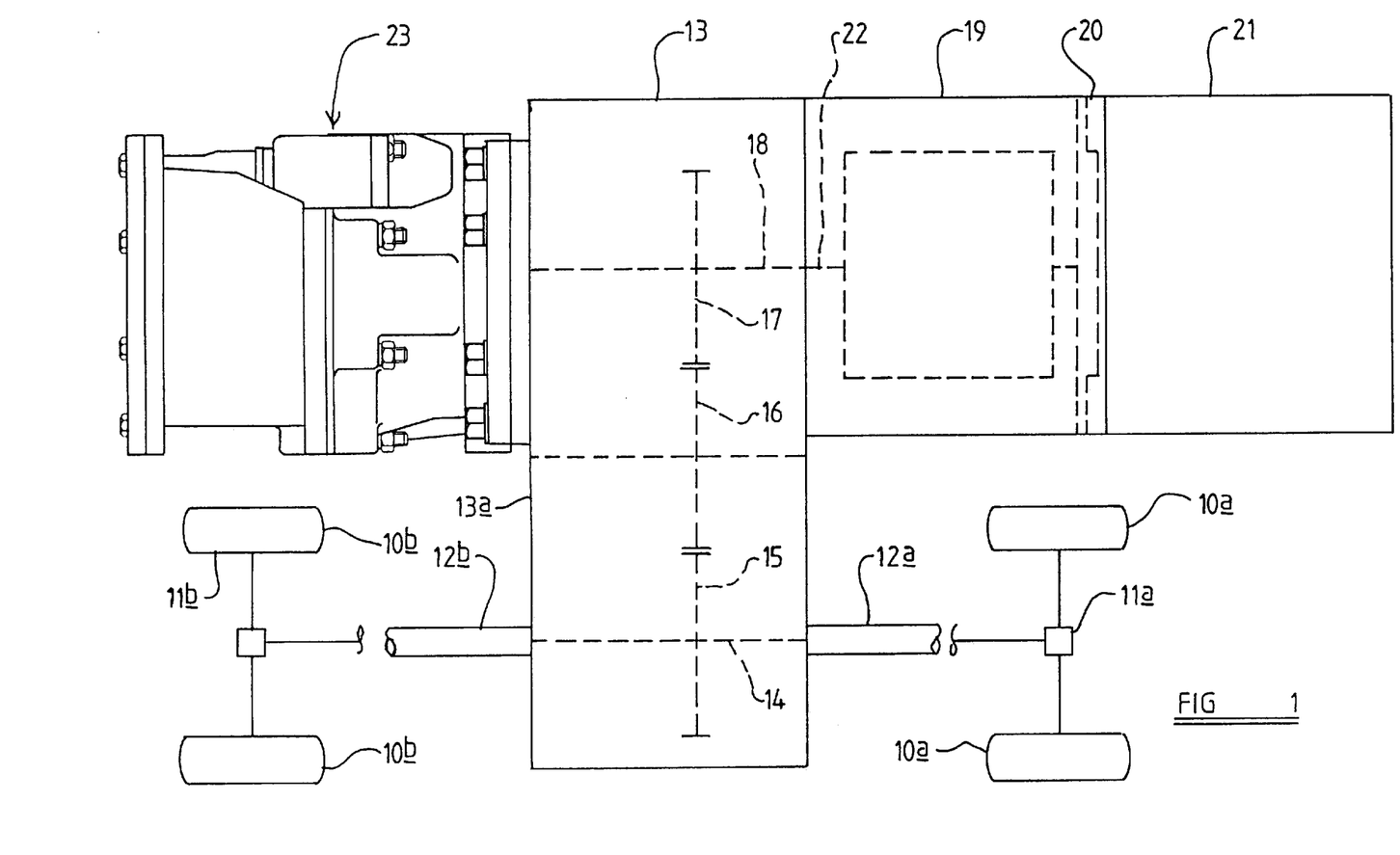
FIG. 1 is a diagrammatic fragmentary view of a four-wheel drive vehicle having an engine and transmission incorporating the invention.

Further to the drawings, a four-wheel drive vehicle has a pair of front, steerable wheels 10a and a pair of rear non-steerable wheels 10b mounted on a chassis of the vehicle, not shown, in conventional manner. The front and rear wheels 10a, 10b are connected through a conventional differential unit 11a, 11b to a propeller shaft 12a, 12b which is connected to an output 14 of the transfer case 13. The output 14 has a gear 15 which is meshed with at least one intermediate gears 16 which meshes with an input gear 17 carried on an input 18 of the transfer case 13. The input 18 is driven by a gearbox 19 which in turn is driven through a clutch 20 by an engine 21.

In a conventional vehicle an output shaft 22 of the gearbox 19 is connected directly to the input 18 of the transfer case so as to drive the output 14 and thus the wheels 10a–10b. However, in the present invention the transmission described hereinbefore is provided with an overdrive unit 23 which is bolted to the transfer case 13 on the opposite side thereof to the gearbox 19 and engine 21. The overdrive 23 has an input and an output disposed on the same side thereof and the output shaft provides an input 18 of the transfer case in substitution for the initial input 18 of the conventional vehicle described hereinbefore.

Referring now to FIGS. 2 to 6 the output shaft 22 from the gearbox 19 comprises a splined end 22a which engages a splined input sleeve 24. The input sleeve 24 is attached to an overdrive input shaft 25, thereby driveably connecting the input shaft 25 and the gearbox output shaft 22. An overdrive output shaft 26 comprises a sleeve shaft rotatably mounted concentric with the input shaft 25 and gearbox output shaft 22.

Figure 2:
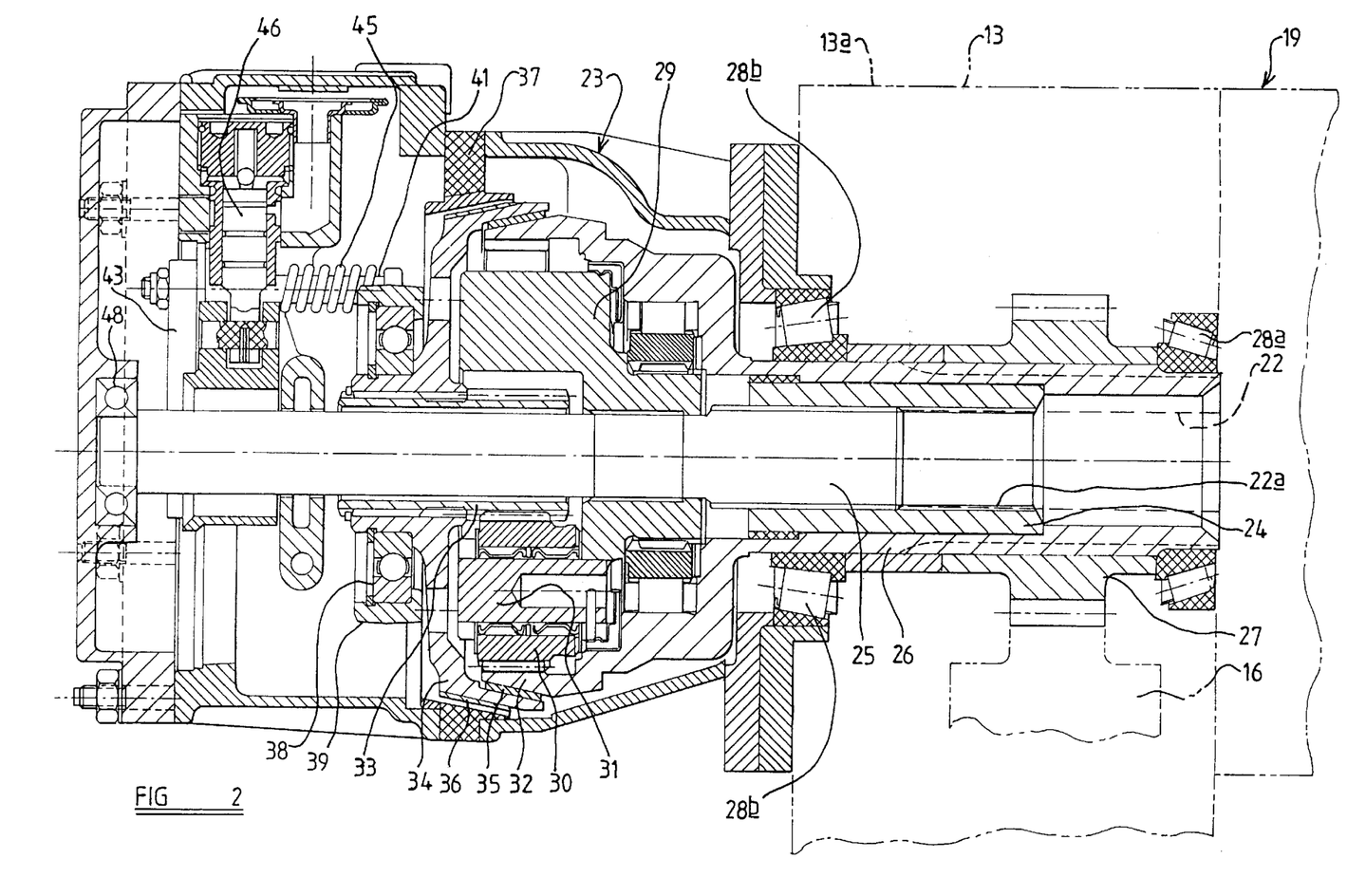
FIG. 2 is a longitudinal cross-section of an assembly of an overdrive unit and transfer unit embodying the invention.
Figure 3:
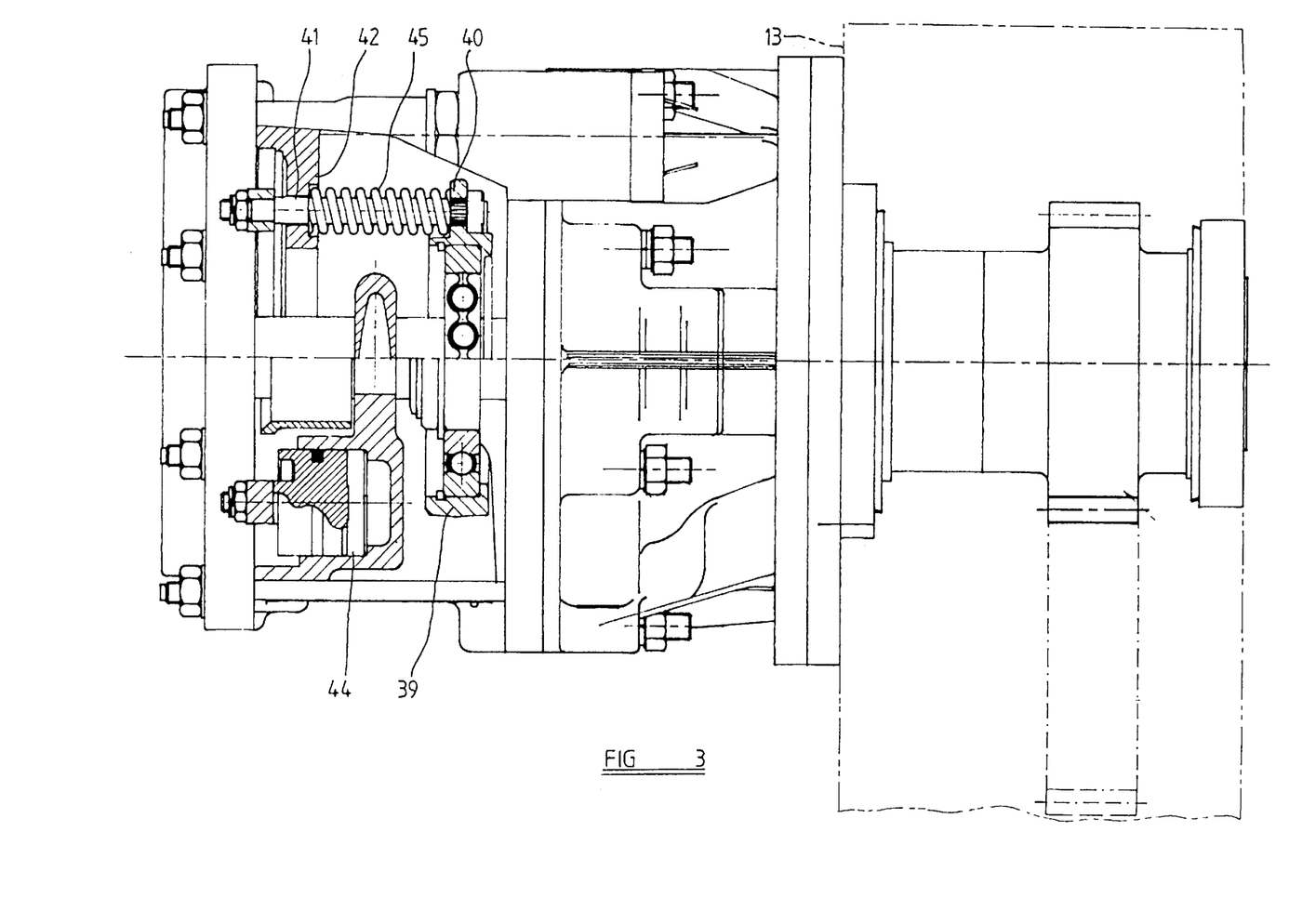
FIG. 3 is a side view of the assembly shown in FIG. 2 taken partly in section on a different line to that of FIG. 2.
Figure 4:
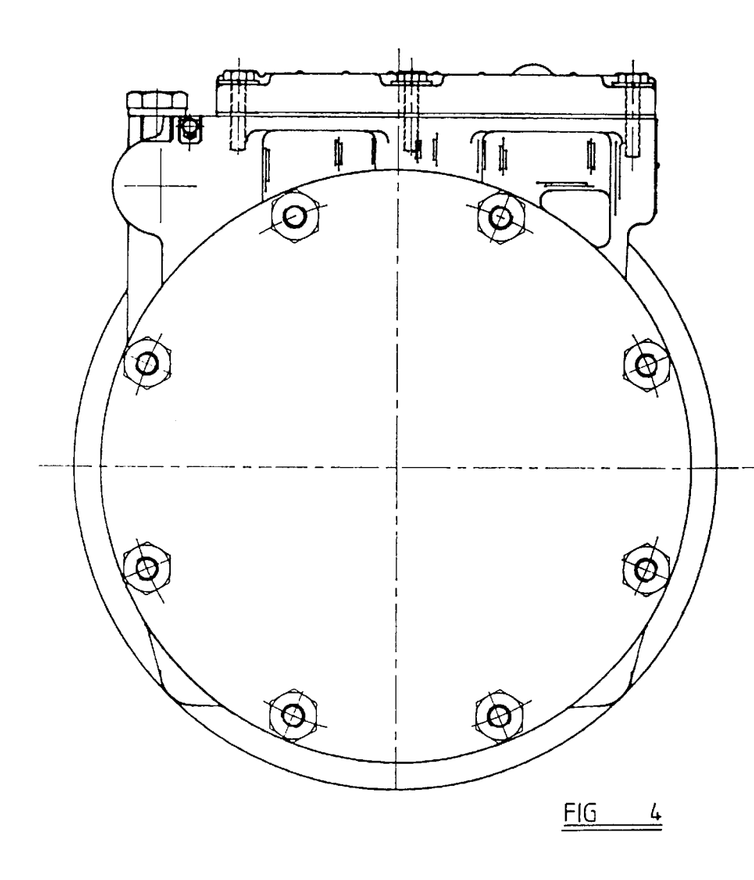
FIG. 4 is an end view of the assembly of FIG. 2 taken in the direction of the arrow A.
Figure 5:
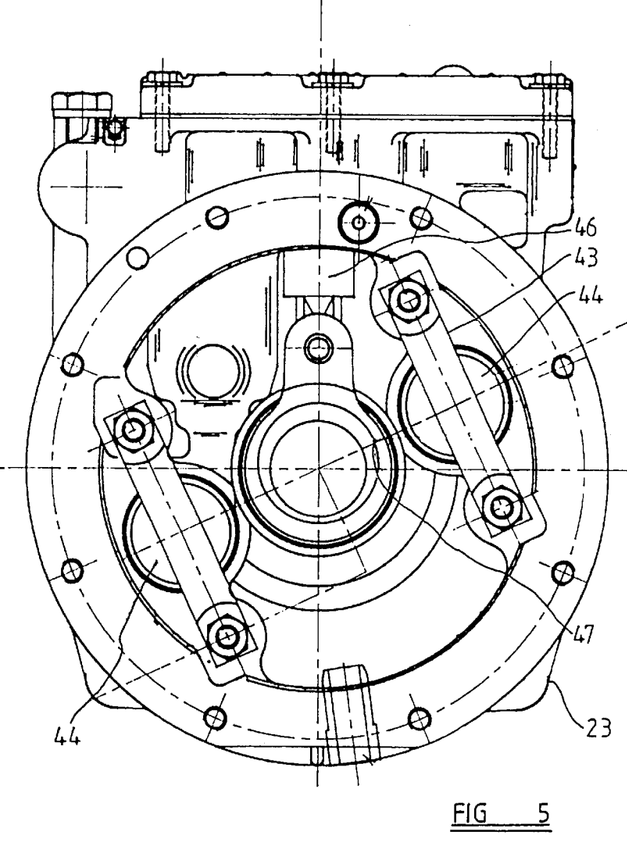
FIG. 5 is an end view taken in the direction of the arrow A but with an end cover removed.
Figure 6:
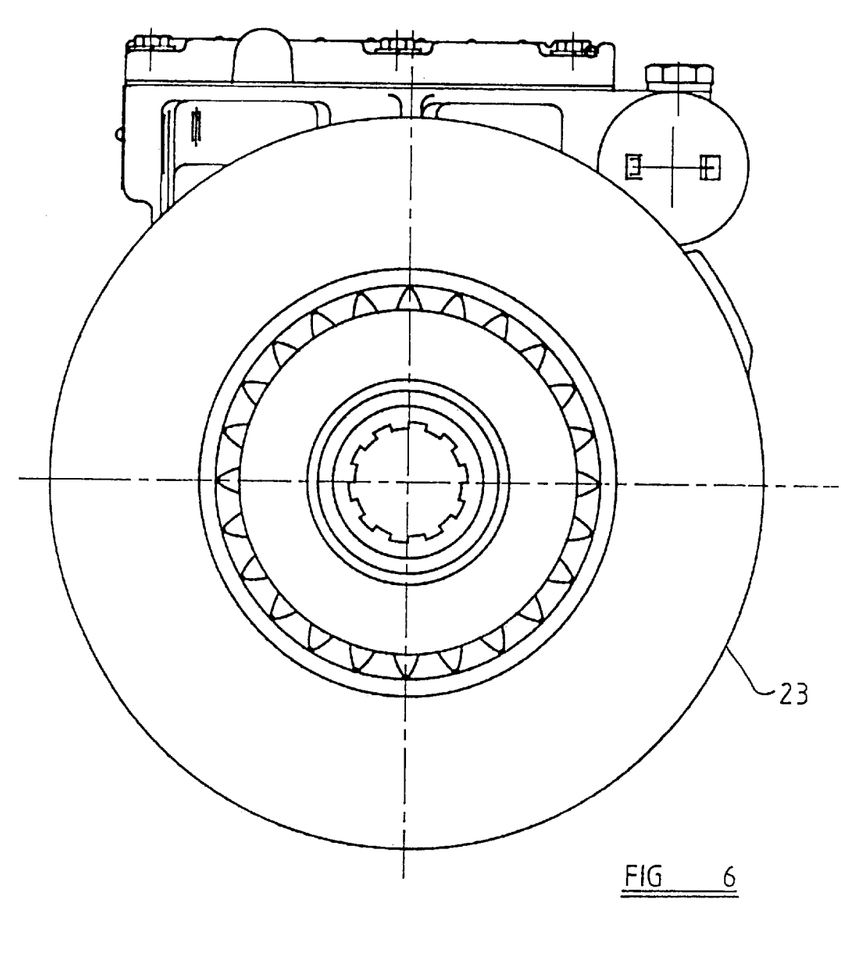
FIG. 6 is an opposite end view of the assembly of FIG. 2 taken in the direction of the arrow B.

An input gear of the transfer unit 13 is provided by a gear 27 which is attached in the present example by a splined connection to the overdrive output shaft 26 and meshes with the intermediate gear 16 of the transfer unit 13. The overdrive output shaft 26 is journalled in bearings 28a, and bearings 28b.

Drivably connected to the input shaft 25 is a planet carrier 29, with a plurality of, for example 3, planet gears 30 rotatably mounted thereon each being journalled on a respective shaft 31. Each planet gear 30 is in mesh with an internally toothed annulus 32 which is drivingly connected, in the present example by being integral therewith, to the overdrive output shaft 26. Each planet gear is further in mesh with a sun gear 33 which is rotatably mounted on the input shaft 25.

The brake means 34 which is slidably splined to a sun gear 33, further comprises brake pads 35, 36. In a first position, shown in FIG. 2, the brake pad 35 engages the annulus 32 and in a second position brake pad 36 engages a portion of a casing 37 of the overdrive unit 23 which provides a stationery ground.

The brake means 34 is slidable axially relative to the sun gear 33 by virtue of the brake means 34 being connected via a bail bearing 38 to an actuator element 39 having four ears 40 each connected to a rod 41 slidable in a transverse wall 42 of the overdrive. Pairs of the rods 41 are linked by straps 43 which are engaged by a piston and cylinder unit 44. A coil compression spring 45 is disposed around each rod 41 so as to be interposed between an ear 40 and the transverse wall 42. Accordingly the springs 45 normally bias the brake member 34 to the right in FIG. 2 whilst actuation of the pistons 44 causes movement of the brake member 34 to the left in FIG. 2.

An oil pump 46 is provided, operable by a cam 47, to provide oil under pressure which can be fed to the pistons 44 by suitable valve means. A bearing 48 is provided for the left hand end of the input shaft 25.

In operation, rotation of the output gearbox shaft 22 is transferred to the input shaft 25 via the input sleeve 24. In direct-drive mode, the planet carrier 29 is constrained to rotate with the input shaft 25 because in this mode, the brake means 34 is disposed in a first position whereby friction pad 35 abuts the annulus 32. The sun gear 33 and the annulus 32 are thus prevented from rotating relative to one another, and thus prevent the planet gears 30 from rotating. As a result the planet carrier 29 is constrained to rotate at the same rate as the annulus 32 and the sun gear 33 and hence at the same rate as the input shaft 25 and the gearbox output shaft 22. The overdrive output shaft 26 and the output gear means 27 hence also rotate at the same rate and in the same sense as the gearbox output shaft 22.

When an overdrive mode is activated, the fluid pressure pistons 44 are activated to move the brake means 34 to the left as shown in FIG. 2 against the resistance of the coil compression springs 41. The friction pad 36 thus engages the overdrive case 37 and so prevents the sun gear 33 from rotating. The annulus 32 is free to rotate relative to the sun gear 33, and hence the planet gear 30 is free to rotate. The annulus 32 is thus driven by the input shaft via the planet carrier 29 and the planet gear 30. A given rate of rotation of the planet carrier 29 causes a larger rate of rotation of the annulus 32. Consequently, the overdrive output shaft 26 rotates at a rate greater than that of the gearbox output shaft 22.

Preferably, the overdrive output shaft 26 rotates at a rate 28% greater than that of the gearbox output shaft 22, although other relative rates of rotation may be provided if desired.

The overdrive unit 23 may be attached to the transfer unit 13 after removing a part of a case 13a of the transfer unit. Conveniently, this may be an inspection hatch. The transfer unit comprises an input initially comprising a gear 17, splined to an initial input shaft 18 which is driven by the gearbox output shaft 22 and is in engagement with the intermediate gear 16 of the transfer unit 23. The initial gear 17 is attached to the initial input shaft 18 of the transfer box by splines and may be removed by sliding it longitudinally along the initial input shaft 18 whereupon the initial input shaft 18 can be removed. The overdrive unit 23 is then attached to the transfer unit 13 such that the input sleeve 22a engages the gearbox output shaft 22, the overdrive output shaft 26 replaces the initial input shaft 18 previously provided in the transfer box and is mounted in the transfer box by the bearings 20a, 20b which previously journalled the initial input shaft. In addition, the output gear 27 replaces the initial input gear 17 and engages the intermediate gear 16. It will be apparent that this process requires no substantial modification to the existing transfer case 13.

We claim:

1. A vehicle comprising an engine, a gearbox and a transfer unit wherein the transfer unit comprises an input and an output which are manually laterally off-set, the vehicle further comprising an overdrive unit disposed on the opposite side of the transfer unit to the gearbox and the engine, the overdrive unit having an input shaft and an output shaft, the input shaft of the overdrive unit being driveably connected to the gearbox output shaft and the output shaft of the overdrive unit being in driving connection with the input of the transfer unit, the input shaft and output shaft of the overdrive unit being disposed on the same side of the overdrive unit.

2. A vehicle according to claim 1 wherein the transfer unit comprises a case and wherein bearing means are provided in the case in which the output shaft of the overdrive unit is journalled.

3. A vehicle according to claim 1 wherein the gearbox output shaft is connected to the input shaft of the overdrive unit by means of an input sleeve.

4. A vehicle according to claim 3 wherein the input sleeve engages splines provided on the gearbox output shaft.

5. A vehicle according to claim 1 wherein the input of the transfer unit comprises a gear mounted on the output shaft of the overdrive unit.

6. A vehicle according to claim 1 wherein the overdrive unit comprises an input shaft, an output shaft drivingly connectable to said input shaft, and control means having a first position wherein said input shaft drives said output shaft at a first relative rate of rotation and a second position wherein said input shaft drives said output shaft at a second different relative rate of rotation, said input shaft and said output shaft being disposed on the same side of the overdrive unit.

7. A vehicle according to claim 6 wherein the first relative rate of rotation is unity so that the input and output shafts rotate at the same rate of rotation and the second rate of relative rotation is such that the output shaft rotates at a different rate of rotation to the input shaft.

8. A vehicle according to claim 6 wherein said output shaft is a sleeve shaft and said input shaft is disposed within and concentric with said output shaft.

9. A vehicle according to claim 6 wherein the input shaft is driveably connected to the output shaft by an intermediate gear means.

10. A vehicle according to claim 9 wherein the immediate gear means comprises a planet gear supported by a planet carrier which is driveable by said input shaft, the planet gear being in mesh with an internally toothed annulus which is driveably connected to said output shaft, the planet gear also being in mesh with a sun gear which is rotatably mounted on and concentric with said input shaft.

11. A vehicle according to claim 10 wherein said control means comprises a brake means connected to said sun gear, wherein when the control means is in a first position the sun gear is constrained by the brake means to rotate at the same rate as the annulus, and when the brake means is in a second position the sun gear is held stationary relative to a ground by the brake means.

12. A vehicle according to claim 11 wherein the control means comprises fluid pressure means whereby the control means is movable between its first position and its second position.

13. A vehicle according to claim 6 wherein when the control means is in the second position, the output shaft rotates at a rate in the range of 25% to 33% greater than that of the input shaft.

14. A method of providing an overdrive in a vehicle wherein the vehicle comprises an engine, a gearbox having an output shaft and a transfer unit, comprising a transfer case having an input and an output which are mutually laterally off-set, the method comprising the steps of attaching an overdrive unit to the transfer case on the opposite side thereof to the gearbox and the engine, such that an input of the overdrive unit is drivably connected to the gearbox output shaft and an output shaft of the overdrive unit is in driving connection with the output of the transfer unit.

15. A method according to claim 14 comprising the step of removing a portion of the transfer case, removing an initial input gear of the transfer unit and providing a replacement gear which is drivingly connected to the output shaft of the overdrive unit and is in said driving connection with the output of the transfer unit.

16. A method according to claim 14 including the additional step of providing bearings in the transfer case wherein the output shaft of the overdrive unit is journalled.

17. A method according to claim 14 wherein the overdrive unit is an overdrive unit comprising an input shaft, an output shaft drivingly connectable to said input shaft, and control means having a first position wherein said input shaft drives said output shaft at a first relative rate of rotation and a second position wherein said input shaft drives said output shaft at a second different relative rate of rotation, said input shaft and said output shaft being disposed on the same side of the overdrive unit.

\* \* \* \* \*

UNITED STATES PATENT AND TRADEMARK OFFICE
CERTIFICATE OF CORRECTION

PATENT NO. : 5,980,419
DATED     : Nov. 9, 1999
INVENTOR(S) : Anthony Rouse, David Hiscox It is certified that error appears in the above-identified patent and that said Letters Patent is hereby corrected as shown below:

Title page, under "FOREIGN PATENT DOCUMENTS", after "2062140", change "8/1981", to read --5/1981--.

Signed and Sealed this

Sixteenth Day of May, 2000

Attest:

Q. TODD DICKINSON

*Attesting Officer*       Director of Patents and Trademarks

UNITED STATES PATENT AND TRADEMARK OFFICE
CERTIFICATE OF CORRECTION

PATENT NO. : 5,980,419
DATED : November 9, 1999
INVENTOR(S) : Anthony Rouse and David Hiscox It is certified that error appears in the above-identified patent and that said Letters Patent is hereby corrected as shown below:

<u>Column 4,</u>
Line 43, change "manually", to read -- mutually --.

Signed and Sealed this

Eleventh Day of March, 2003

JAMES E. ROGAN
*Director of the United States Patent and Trademark Office*